US012680925B2

(12) United States Patent
Chen et al.

(10) Patent No.: US 12,680,925 B2
(45) Date of Patent: Jul. 14, 2026

(54) PNEUMATIC NEBULIZATION-PHOTOCHEMICAL VAPOR GENERATION DUAL MODE SAMPLE INTRODUCTION SYSTEM

(71) Applicant: The United States of America, as Represented by the Secretary of Agriculture, Washington, DC (US)

(72) Inventors: Guoying Chen, North Wales, PA (US); Bun Hong Lai, Roslyn, PA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 286 days.

(21) Appl. No.: 18/485,906

(22) Filed: Oct. 12, 2023

(65) Prior Publication Data
US 2025/0123191 A1     Apr. 17, 2025

(51) Int. Cl.
*B01D 19/00*          (2006.01)
*G01N 1/40*           (2006.01)
(Continued)

(52) U.S. Cl.
CPC ............. *G01N 1/4005* (2013.01); *G01N 1/44* (2013.01); *G01N 21/714* (2013.01)

(58) Field of Classification Search
CPC ...... G01N 1/4005; G01N 1/44; G01N 21/714; G01N 1/34; G01N 27/623; G01N 30/72; G01N 2030/743; G01N 2030/746; H01J 49/0436; B01D 2311/04; B01D 2311/2619; B01D 2311/263; B01D 2315/22; B01D 19/0031; G01J 3/00

USPC ......... 73/53.01, 61.41–61.43, 64.56, 863.23, 73/84.81; 239/370; 436/173, 174; 356/36, 326–330; 250/339.07, 390.07
See application file for complete search history.

(56) References Cited

U.S. PATENT DOCUMENTS 6,891,605 B2     5/2005   McLaughlin et al.

FOREIGN PATENT DOCUMENTS

WO     WO-2006063438 A1 *  6/2006   ......... G01N 21/3103
WO     2020/127319       6/2020

OTHER PUBLICATIONS

Henryk Matusiewicz, "Development of interface for online coupling of micro-fluidic chip-based photo-micro-reactor/ultrasonic nebulization with microwave induced plasma spectrometry and its application in simultaneous determination of inorganic trace elements in biological materials", Microchemical Journal, 119 (2015) 133-139, Elsevier.

(Continued)

*Primary Examiner* — Robert R Raevis
(74) *Attorney, Agent, or Firm* — John Fado; John Henri

(57)          ABSTRACT
Efficient and economic devices and methods for dual-mode sample introduction of liquid samples to an analytical detector exemplified by an inductively coupled plasma mass spectrometer (PVG-ICPMS) or an inductively coupled plasma optical emission spectrometer (ICPOES) are described. Various embodiments of pneumatic nebulization (PN)-photochemical vapor generation (PVG) dual-mode introduction can enhance introduction efficiency for PVG-active elements and smooth, bubble-free nebulization for all elements. A compact yet highly efficient porous membrane gas-liquid separator (MGLS) in its various embodiments plays a key role in systems and methods described.

9 Claims, 2 Drawing Sheets

(51) Int. Cl.
    *G01N 1/44*        (2006.01)
    *G01N 21/71*      (2006.01)

(56)               References Cited

OTHER PUBLICATIONS

K. Jankowski, Improved determination of iodine by sequential (photo)chemical vapor generation and pneumatic nebulization in the programmable temperature spray chamber and inductively coupled plasma optical emission spectrometry, Microchemical Journal, 113 (2014) 17-22, Elsevier.
J. Giersz et al., 2017, "Talanta", Elsevier 167: 279-285.
Ralph E. Sturgeon, 2022, "Chapter 7—Photo-sono-thermo-chemical vapor generation techniques", Elsevier 213-263.

* cited by examiner

FIG. 1A                    FIG. 1B

PNEUMATIC NEBULIZATION-PHOTOCHEMICAL VAPOR GENERATION DUAL MODE SAMPLE INTRODUCTION SYSTEM

BACKGROUND OF THE INVENTION

The integration of inductively coupled plasma technology to mass spectrometry and optical emission spectroscopy has yielded extremely powerful analytical tools applied in diverse fields such as toxicology, food science, metallurgy, geochemistry, environmental science, life science, material science, etc.

Pneumatic nebulization (PN) is the traditional method of sample introduction to inductively coupled plasma mass spectrometry (ICPMS) and inductively coupled plasma optical emission spectrometry (ICPOES) (the later also known as Inductively coupled plasma atomic emission spectroscopy). PN is applicable to analysis of all elements but suffers from low (1-3%) sample introduction efficiency due to the loss of larger aerosols. Hydride generation (HG) and photochemical vapor generation (PVG) are two techniques to enhance introduction efficiency by turning analytes to gas phase. However, only about one dozen elements are amenable to hydride generation and about two dozen are to photochemical vapor generation.

The goal of dual-mode, (PN-HG) or (PN-PVG), sample introduction is to fully utilize the multielement capability of ICPMS or ICPOES for simultaneous multi-elemental analysis that promotes productivity. Dual mode introduction achieves universal coverage and high introduction efficiency for active elements.

Thus far, two PN-PVG dual-mode introduction systems have been developed: (1) swirling PN-generated aerosols in a cyclonic spray chamber were exposed to a UV lamp at the center, or (2) photoreactor effluent was directly nebulized into a spray chamber. The resulting ICPMS signals, unfortunately, suffer from considerable noise due to highly dynamic aerosol-UV lamp interaction and unstable light intensity attenuated by dynamic condensate on lamp surface in the first system, or sporadic nebulization in the second system due to bubble-segmented flow.

The effluent of a PVG reactor releases certain fraction of vapor as bubbles in the liquid flow. These bubbles segment the liquid flow causing sporadic nebulization and noise in the signal. A conventional U-shaped gas-liquid separator (GLS) fulfils bubble separation but disrupts the flow, causing time delay and pressure loss requiring a second pump to fulfil nebulization. However, this pump is out of sync with the sampling pump, creating failures in data processing.

Thus, there is a need in the field to address the various problems discussed above. The inventions described below address these problems related to analytical instrumentation.

SUMMARY OF THE INVENTION

Devices and methods are described for producing a debubbled liquid stream by passing it over a porous membrane to separate bubbles in the liquid. The debubbled liquid stream can be fed to the sample entrance of a detector.

In one embodiment, the device is configured to pass a photochemically reduced liquid sample stream over a porous membrane with the liquid sample on one side of the membrane and gas phase on the other side of the membrane. The bubbles in the liquid stream pass through the porous membrane to gas phase on the other side of the membrane and are optionally swept by a purge gas stream. The porous membrane is exemplified by an inert material such as polytetrafluoroethylene (PTFE). The purge gas employed can be an inert gas.

An inductively coupled plasma mass spectrometer (ICPMS) or an inductively coupled plasma optical emission spectrometer (ICPOES) system with a membrane gas flow separator or debubbler for dual-mode pneumatic nebulization-photochemical vapor generation is described which has:

a photochemical reactor with a source of UV light for photochemical reduction of an analyte stream for analysis.

a porous membrane gas-liquid separator (MGLS) or debubbler connected to the photochemical reactor and receive its effluent, and separate bubbles present within. This yields a continuous liquid stream for a stable, bubble-free feed to nebulizer with reduced signal noise. Analyzers are exemplified by an inductively coupled plasma mass spectrometer (ICPMS) or an inductively coupled plasma optical emission spectrometer (ICPOES).

A method of generating a photochemically generated sample stream comprising the steps of exposing a liquid sample to a UV source and photochemically generating sample stream with gaseous (some are still dissolved) analyte species, passing the photochemical reactor output stream to a debubbling membrane gas-liquid separator (MGLS) and separating the liquid and gas effluents by passing them over a porous polytetrafluoroethylene (PTFE) membrane to separate gas to one side of the membrane and liquid on the other side of the membrane. The liquid stream providing smooth, bubble-free sample flow and nebulization yielding a stable mist stream with reduced noise to an analyzer are exemplified by inductively coupled plasma mass spectrometer (ICPMS) or inductively coupled plasma optical emission spectrometer (ICPOES).

1*b*. Configuration shows a photochemical vapor generation-membrane gas liquid separation-pneumatic nebulization-inductively coupled plasma mass spectrometer (PVG-MGLS-PN-ICPMS) system with gas of bubble origin included for detection.

1*c*. Configuration shows a photochemical vapor generation-membrane gas liquid separation-pneumatic nebulization-inductively coupled plasma mass spectrometer (PVG-MGLS-PN-ICPMS) system with gas of bubble origin discarded.

Figure 2A:
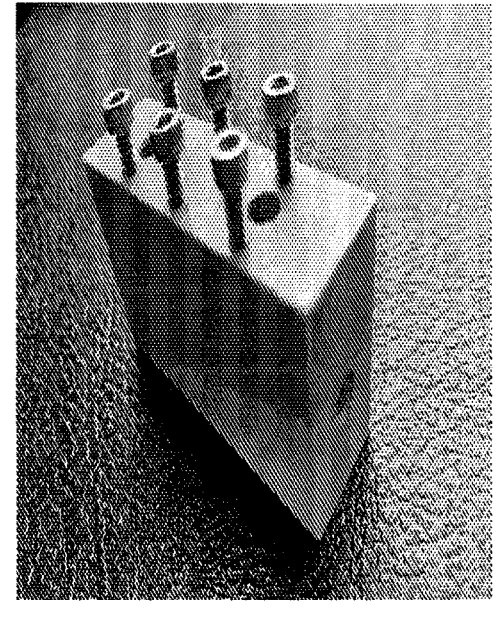
Figure 2B:
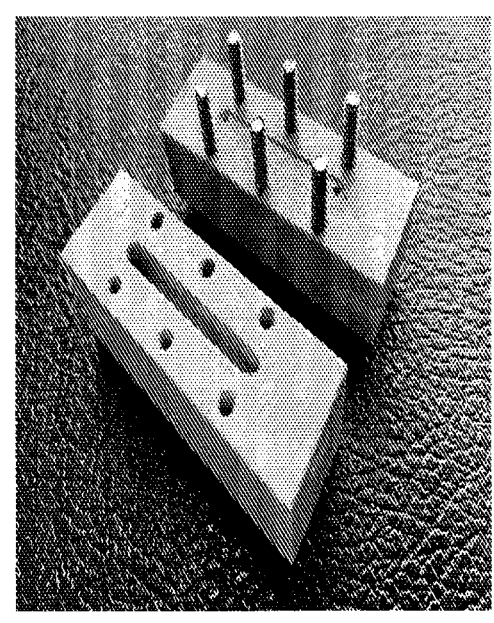
Figure 2C:
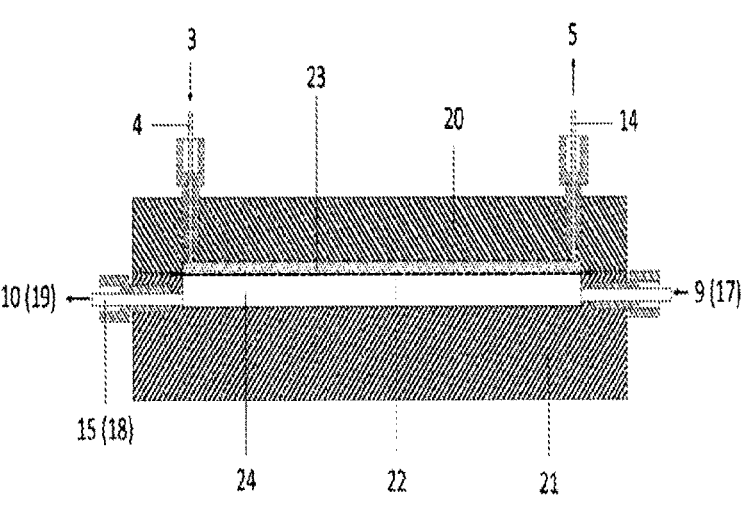

FIGS. 2 *a-c* show an embodiment of a porous membrane debubbler. FIGS. 2*a* and 2*b* show the PEEK body assembly without a membrane and inlet and outlet connectors; FIG. 2*c* shows the cross section of a debubbler.

DETAILED DESCRIPTION

Described herein in various embodiments are efficient new photochemical vapor generation-pneumatic nebulization (PN-PVG) dual-mode sample introduction systems (FIG. 1 *b, c*) using a porous membrane gas-liquid separator (MGLS) 13 to alleviate signal variation and providing smooth analyte flow to a detector.

In one embodiment, a photochemical vapor generation-membrane gas liquid separator-inductively coupled plasma mass spectrometer (PVG-MGLS-ICPMS) system is described. PVG uses low molecular weight compounds that act as reducing agents under photochemical reaction conditions reducing for example, metal ionic species to metal atoms, etc. For example, formic acid reacts with UV light and generates reductive species and gaseous products including ·COOH, H·, $CO_2\cdot^-$, CO, $H_2$, etc. that tend to form bubbles. The new system eliminates bubbles from the photochemical reactor output liquid flow practically eliminating segmentation of photoreactor effluent with a membrane gas liquid separation system (MGLS) without introducing any time delay, and maintains the flow pressurized without the need of another nebulization pump. The porous membrane gas liquid separation system (MGLS) removes bubbles from the sample stream which lead to intermittent, sporadic nebulization. The MGLS thus eliminates or greatly reduces nebulization noise and spectral signal noise as well.

Effective implementation of PN-PVG dual-mode introduction includes favorable conditions: photochemistry requires an energetic radiation source, ideally in the UV-C region (200-280 nm); and certain amount of UV radiation exposure duration is required to generate photochemical reaction product and enough volatile species due to reaction kinetics and limited penetration depth of UV radiation into the solution. In comparison, UV-B radiation (280-320 nm) is photochemically less effective, UV-A (320-400 nm) and visible (400-700 nm) radiations are photochemically ineffective. On the other extreme, vacuum UV (100-200 nm) radiation is too energetic to use and resulting ozone is problematic. In one embodiment, the exposure of UV duration can range for example from 0.67-0.8 min. (minutes), calculated from the reactor volume (0.8 mL) and the highest liquid pump flow rate (1-1.2 mL/min) (milliliters/minute). In other embodiments, the flow rate is between 0.1 and 3.0 min. In some embodiments, at 1-1.2 mL/min flowrate, the nebulization efficiency is lower than that at a slower flowrate. The photoreactor can be powered for example by a low-pressure mercury discharge lamp rated at 19 W. Lamp power may not be easily adjustable. In different embodiments, various lamps rated at for example 3-19 W, 1-30 W and UV LED arrays at a lower power can be used. In some embodiments, longer UV exposure duration may lead to voluminous gas generation and unstable signal, and some PVG products may be reoxidized. In different embodiments the tubes in the photoreactor have a dimension 4 mm outer diameter for example. In other embodiments, smaller diameter tubes can be employed at for example 1 mm and dimensions of tubes may vary ranging from 0.2 mm to 15 mm. Besides the preferred low-molecular weight carboxylic acids, alcohols and aldehydes can also be used. In different embodiments, formic acid and acetic acid, 0%-5% alone or in combination are used. In some embodiments, higher concentrations may adversely affect ICP-MS operation and instrument. In various embodiments, the photochemical vapor generation system is operated at room temperature. In other embodiments, the reactor may be cooled by a fan to optimize gas liberation. Variations on design of photoreactors can be found in Vapor Generation Techniques for Trace Element Analysis, pp 217-218 and Int. Patent application, Sturgeon et al. WO 2006/063438 A1 incorporated herein by reference.

As the analytical sample passes through the photoreactor 3 of the PVG and undergoes photochemical reactions, gases are generated including photolytic products of low-molecular weight carboxylic acid (LMWCA) and vapor of PVG-active analytes which are partially liberated as bubbles which segment the liquid flow leading to intermittent, sporadic nebulization.

The photoreactor effluent flows through a liquid channel 23, while bubbles permeate the membrane into an opposing gas channel 24. The channels separated by the porous membrane 22 can take on any shape that facilitates transfer of bubbles across the membrane out of the liquid phase. The liquid channel maybe a tubular outer channel concentric with an inner gas channel formed by the membrane. Alternately, the liquid channel maybe a tubular inner channel concentric with an outer gas channel formed by the membrane. The membrane can thus take on different shapes such as a sheet, tube, arch or other suitable surface for bubble permeation.

In different embodiments, built around a porous polytetrafluoroethylene (PTFE) membrane in a tubular or sheet format, a membrane gas-liquid separator (MGLS) functioning as a debubbler possesses the unique advantages in its small internal volume. Advantageously, while the porous membrane allows easy permeation of gases at low pressure, the membrane surface forms a hydrophobic barrier to liquid flow under water breakthrough pressure. These unique features of MGLS enable debubbling yet maintain a liquid stream under a desired pressure without introducing extra time delay.

The porous membrane debubbler shown in FIG. 2c essentially has a membrane 22 separating gas phase stream from liquid phase.

In various embodiments the MGLS devices described herein have two partitions or streams for fluids shaped by the device body or chamber and partitioned or separated by the porous membrane 22 wherein the chamber maybe of any shape including tubular, cylindrical, spherical, cubical or any shape that enables the separation of gaseous phase from liquid phase by a membrane so that bubbles move across the membrane interface and are separated from the solution. The debubbler body can be constructed of any polymer including inert polymers such as PEEK, PTFE, other organic polymers, metals coated with polymers like PTFE, etc.; metals, carbon fiber and any other suitable material. FIG. 2c of the drawings shows the body cross section of a MGLS debubbler device embodiment.

Figure 1C:
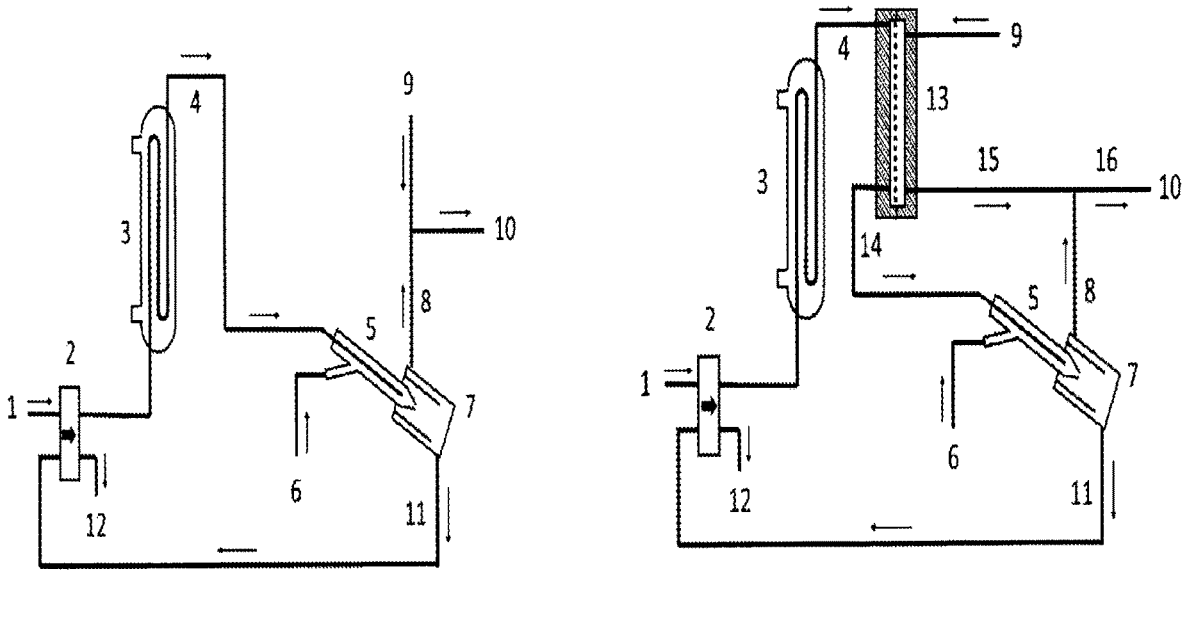
FIGS. 1 *a-c* show examples of experimental setup. 1*a*. Configuration shows a photochemical vapor generation-pneumatic nebulization-inductively coupled plasma mass spectrometer (PVG-PN-ICPMS) system without a membrane gas-liquid separator (MGLS).
Figure 1C:
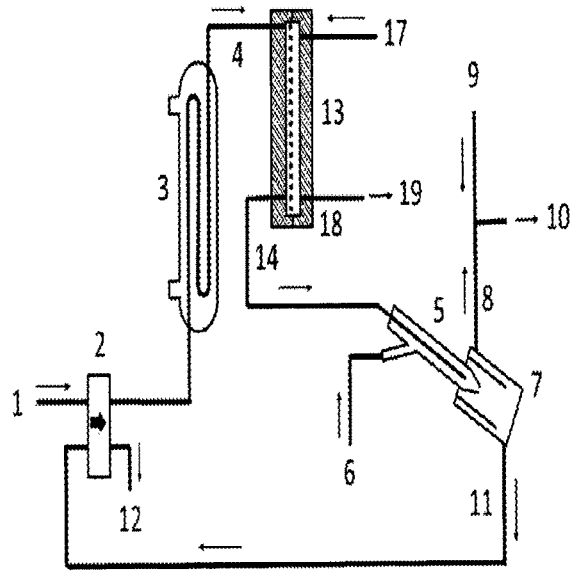

In one aspect, a gas-liquid separator device with a chamber having inlets and outlets for fluids to pass through is described having a chamber partitioned into separate partitions or cavities by a porous membrane for separation of a gas liquid mixture by contacting said gas liquid mixture with the membrane. (One example is illustrated in FIG. 1c).

The gas-liquid separator has a porous polytetrafluoroethylene (PTFE) membrane in one embodiment. The gas-liquid separator has one inlet and one outlet for each cavity of the chamber portioned by the porous membrane in one embodiment. The gas-liquid separator has one of its cavities or partitions or partitioned chambers 23 connected to a liquid flow stream through an inlet and an outlet and the other partition 24 is connected to a gas stream through an inlet and an outlet as shown in FIG. 1c and FIG. 2c.

The porous polytetrafluoroethylene (PTFE) membrane is a sheet or tubular in form in various embodiments. The gas-liquid separator has one inlet connected to a photochemical reactor 3 in one embodiment. The gas-liquid separator has one outlet connected to a pneumatic nebulizer 5 in one embodiment.

In other embodiments, the gas-liquid separator has a chamber having multiple cavities each with a plurality of porous membranes, inlets and outlets for debubbling and gas liquid separation.

In other embodiments, the gas-liquid separator has a chamber which is shaped in the form selected from a cuboid, cylinder, sphere, cone, polyhedral, ellipsoid, symmetric, asymmetric, rigid, flexible or irregular form to contain a volume of fluids in the gas-liquid separator device.

In other embodiments, the debubbler or gas-liquid separator is connected directly or indirectly via a nebulizer 5 to a mass spectral detector which is selected from various kinds including an inductively coupled plasma mass spectrometer (ICPMS) 10 or an inductively coupled plasma optical emission spectrometer (ICPOES).

In one embodiment, the gas-liquid separator has a porous membrane separating the chamber into cavities serving as two channels, one for a liquid and one for gas, wherein a photoreactor effluent 4 flows through the liquid channel in contact with the porous membrane, while bubbles in the form of gases from said liquid photoreactor output stream 4 permeate through the membrane 22 into the gas channel 24 connected to an optional gas inlet 9 (argon) or 17 (nitrogen) admitting a purge gas flowing to the gas outlet 10 (ICPMS) or 19 (exhaust) to separate bubbles from the liquid stream.

In one embodiment, the membrane gas-liquid separator chamber is built from PEEK polymer. In one embodiment, the membrane gas-liquid separator system has a porous polytetrafluoroethylene (PTFE) membrane 22 in a tubular or sheet format with a liquid inlet and outlet for sample inflow from a photoreactor 3 to an analyzer 10, and a gas inlet and outlet for a purge gas 17 to vent exhaust 18.

In one embodiment, the membrane gas-liquid separator system has a porous polytetrafluoroethylene (PTFE) membrane with 0.001 to 5 μm pore size. In one embodiment, the membrane gas-liquid separator system has a porous polytetrafluoroethylene (PTFE) membrane with 0.01 to 2 μm pore size. In one embodiment, the membrane gas-liquid separator system has a porous polytetrafluoroethylene (PTFE) membrane with 0.1 to 2 μm pore size. In one embodiment, the membrane gas-liquid separator system has a porous polytetrafluoroethylene (PTFE) membrane with 0.1 to 1 μm pore size. In one embodiment, the membrane gas-liquid separator system has a porous polytetrafluoroethylene (PTFE) membrane with 0.2 μm pore size.

In one embodiment, the membrane gas-liquid separator system has a porous material which is polytetrafluoroethylene (PTFE) membrane material made of polytetrafluoroethylene (PTFE), PCTFE (polychlorotrifluoroethylene), FEP (fluorinated ethylene propylene), or perfluoroalkoxy (PFA).

In various embodiments, methods of sample introduction to ICPMS are described employing the steps of sample analyte exposure to a UV source to produce a photochemically reduced sample stream, passing said photochemically reduced sample stream over a porous membrane to separate entrained and/or cavitation bubbles in the liquid to produce a debubbled liquid stream, nebulization of the debubbled liquid stream, and, feeding the nebulized mist and vapor to an inductively coupled plasma. In one embodiment, the membrane material used in the method is made of polytetrafluoroethylene (PTFE), PCTFE (polychlorotrifluoroethylene), FEP (fluorinated ethylene propylene), or perfluoroalkoxy (PFA).

In one embodiment, the method employs a step of passing said photochemically reduced sample stream over a porous membrane with the liquid sample on one side of the membrane and gas phase on the other side of the membrane.

In one embodiment, the method employs a step where the gas stream is swept by a purge gas stream. In one embodiment, the method employs a step where the purge gas stream is an inert gas stream.

In various embodiments, an inductively coupled plasma mass spectrometer (ICPMS) or an inductively coupled plasma optical emission spectrometer (ICPOES) is described with a membrane gas flow separator for dual-mode pneumatic nebulization-photochemical vapor generation with: a photochemical reactor with a source of UV light for photochemical conversion of a liquid analyte stream for analysis; a porous membrane gas-liquid separator (MGLS) or debubbler; a nebulizer; and, an inductively coupled plasma optical emission spectrometer (ICPOES).

In one embodiment of the system above, the porous membrane gas-liquid separator (MGLS) or debubbler employs two channels or cavities separated by a porous membrane, one channel or cavity is for a liquid and one cavity for a gas stream, wherein a photoreactor output analyte stream flows through the liquid channel in contact with the porous membrane, part of vapor is liberated as bubbles in the liquid that permeate through the membrane into the gas channel connected to a gas inlet admitting a purge gas flowing to a gas outlet to sweep away the bubble gas debubbling the analyte stream.

In various embodiments devices and methods for producing a bubble-free liquid stream or a liquid stream with reduced bubbles by passing it over a porous membrane to separate bubbles in the liquid are described. The debubbled liquid stream can be fed to the sample entrance of a detector. The source of the stream for debubbling can be a source that introduces gas into a liquid by any means such as a chemical process where gases are evolved or a gas liquid mixing process. The chemical process may be thermochemical, photochemical, polymeric, radical or like process that involves chemical reactions. The material of the porous membrane is suited to the nature of the chemical composition of the liquid/gas in the stream. Highly reactive compositions will require inert membrane materials such as PTFE and the like while non-reactive or chemical species of low reactivity can employ membranes of any suitable polymer such as HDPE, PVDF, PTFE, nylon and the like. The pore size ranges from 0.01 to 10 micrometers in one embodiment. The pore size ranges from 0.1 to 3 micrometers in one embodiment. The pore size ranges from 0.05 to 4 micrometers in one embodiment. The pore size ranges from 0.1 to 0.4 micrometers in one embodiment. The thickness of the membrane employed can range from 1 to 3000 micrometers.

In one embodiment, the device is configured to pass a photochemically reduced liquid sample stream over a porous membrane with the liquid sample on one side of the membrane and gas phase on the other side of the membrane. The bubbles in the liquid stream pass through the porous membrane to a gas phase on the other side of the membrane and are optionally swept by a purge gas stream. The porous membrane is exemplified by an inert material such as polytetrafluoroethylene (PTFE). The purge gas employed can be an inert gas.

Definitions

Photochemical vapor generation (PVG) is the process that an energetic radiation transforms certain elements from liquid phase to gas phase for introduction to an analytical instrument.

Pneumatic nebulization (PN) refers to the process that employs a high-speed gas stream to convert a liquid stream into a fine mist.

Gas-liquid separator (GLS) in various embodiments is a device or system for separation of one or more gases or vapors from liquid phase.

Chamber is an enclosed space or cavity.

A partition is something that divides. A membrane can be used to partition a chamber into two or more cavities with inlets and outlets in various embodiments described herein.

A fluid is any liquid or gas or generally any material including mixtures of liquids and gas, liquid solutions containing organic compounds, inorganic compounds, dissolved gases and the like that cannot sustain a tangential, or shearing, force when at rest and that undergoes change in shape when subjected to such a stress.

Porous is having microscopic spaces or holes in micrometer scale through which liquid or gas may pass. In various embodiments, a microporous membrane is used for devices and methods to strip bubbles from a liquid stream.

Membrane is a sheet layer of material forming a barrier or lining that may be pliable in some embodiments.

An inlet is place or means of entry for a fluid such as tube or hole.

An outlet is a place or means of exit for a fluid such as tube or hole.

A mixture is a substance made by mixing two or more substances together. In various embodiments described herein, an example of a mixture comprises of a fluid with water, analyte, photolytic products of low-molecular weight carboxylic acid (LMWCA) and vapor of PVG-active analytes, gases, etc.

Debubbling is the removal of entrained and/or cavitation bubbles from a liquid. Debubbling is the removal of bubbles from a liquid stream which can be understood as eliminating segmentation of liquid stream. Exemplified liquified streams include the effluent of a PVG reactor which releases certain fraction of vapor as bubbles in the liquid stream or flow.

Analyte is a substance whose chemical constituents are being identified or quantified.

Membranes used herein can have a distribution of pores sizes that are distributed around the stated mean size. This means for very small tested area, this can vary considerably depending on a representative sample.

Some exemplified membranes which can be used are commercially available such as a) Porex BM30® 3.0 µm: Mean pore size is given as 3 micron, with an airflow of 16-40 l/hr/cm$^2$ at a pressure differential of 70 mbar, with a water breakthrough pressure of between 1.7-2.9 mbar, and thickness of 1.5 mm. b) Advantec® 0.2 µm: Pore size is given as 0.2 µm, with an airflow of 0.26-0.55 l/hr/cm$^2$ at a pressure differential of 70 mbar, with a water breakthrough pressure of >2.55 bar, and thickness of 76-152 µm. c) Sterlitech® 0.1 µm: Pore size 0.1 µm, without an airflow listed, with a water breakthrough of 4.14 bar, and thickness of 70 µm.) Sterlitech® 0.2 µm: Pore size is given as 0.2 µm, 0.3-0.9 l/min/cm$^2$ at a pressure differential of 70 mbar, with no water break through pressure listed (though it's assumed to be >45 psi the breakthrough pressure given for the 0.45 µm version), and thickness of 25-51 µm.

Abbreviations: ASTM: American Society for Testing and Materials; DIW: deionized water; FEP: fluorinated ethylene propylene; GLS: gas/liquid separator; HG: hydride generation; ICP: inductively coupled plasma; ICPOES: inductively coupled plasma optical emission spectrometer/spectrometry; ICPMS: inductively coupled plasma mass spectrometer/spectrometry; LEP: liquid entry pressure; LMWCA:

low-molecular weight carboxylic acid; MGLS: membrane gas/liquid separator; PCTFE: polychlorotrifluoroethylene; PEEK: polyether ether ketone; PFA: perfluoroalkoxy; PN: pneumatic nebulization; PTFE: polytetrafluoroethylene; PVG: photochemical vapor generation; RF: radio frequency; RSD: relative standard deviation: S/N: signal-to-noise ratio; UV: ultraviolet; PVDF-Polyvinylidene fluoride or polyvinylidene difluoride (PVDF) is a highly non-reactive thermoplastic fluoropolymer produced by the polymerization of vinylidene difluoride.

Unless otherwise explained, all technical and scientific terms used herein have the same meaning as commonly understood by one of ordinary skill in the art to which this disclosure belongs. The singular terms "a", "an", and "the" include plural referents unless context clearly indicates otherwise. Similarly, the word "or" is intended to include "and" unless the context clearly indicates otherwise.

It is to be understood that wherever values and ranges are provided herein, all values and ranges encompassed by these values and ranges, are meant to be encompassed within the scope of the present disclosure. Moreover, all values that fall within these ranges, as well as the upper or lower limits of a range of values, are also contemplated by the present application.

Ranges: throughout this disclosure, various aspects of the disclosed subject matter can be presented in a range format. It should be understood that the description in range format is merely for convenience and brevity and should not be construed as an inflexible limitation on the scope of the disclosed subject matter. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Unless otherwise indicated, all numbers expressing quantities of ingredients, properties such as molecular weight, reaction conditions (e.g., reaction time, temperature), percentages and so forth as used in the specification and claims are to be understood as being modified in all instances by the term "about." Accordingly, unless otherwise indicated, the numerical properties set forth in the following specification and claims are approximations that may vary depending on the desired properties sought to be obtained in embodiments of the present invention. As used herein, the term "about" refers to a quantity, level, value, or amount that varies by as much as 10% to a reference quantity, level, value, or amount.

The term "consisting essentially of" excludes additional method steps or composition components that substantially interfere with the intended activity of the methods or compositions of the invention and can be readily determined by those skilled in the art (e.g., from a consideration of this specification or practice of the invention disclosed herein). This term may be substituted for inclusive terms such as "comprising" or "including" to more narrowly define any of the disclosed embodiments or combinations/sub-combinations thereof. Furthermore, the exclusive term "consisting" is also understood to be substitutable for these inclusive terms in alternative forms of the disclosed embodiments. "Optional" or "optionally" means that the subsequently described event or circumstance may or may not occur, and that the description includes instances in which said event or circumstance occurs and instances where it does not. The embodiments of inventions described herein encompass any possible combination of some or all of the various embodiments and characteristics described herein and/or incorporated herein. In addition, the invention encompasses any possible combination that also specifically excludes any one or some of the various embodiments and characteristics described herein and/or incorporated herein. Some embodiments of the systems and methods described herein may exclude an element of the invention or a part thereof, or may include additional elements, or may include a minor variation of the elements disclosed herein. Such embodiments are intended to be covered by the present inventive concepts described herein.

Various embodiments of the claims are shown and described herein. It will be obvious to those skilled in the art that such embodiments are provided by way of example only. Numerous variations, changes, and substitutions will occur to those skilled in the art without departing from the embodiments of claims. Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

All publications, patents, and patent applications mentioned in this specification are herein incorporated by reference to the same extent as if each individual publication, patent, or patent application was specifically and individually indicated to be incorporated by reference.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurement. The following examples are intended only to further illustrate the invention and are not intended in any way to limit the scope of the invention as defined by the claims.

Examples

Reagents and Solutions: ACS reagent grade formic acid (≥98%) was purchased from Sigma-Aldrich (Milwaukee, WI, USA). Stock solutions were purchased from SCP Science; working stock solutions were diluted 100 fold in deionized water (DIW). All working standard solutions were prepared daily. Single-use ICPMS grade plasticware with accuracy equal to ASTM class A were used for containing the final sample. DIW was made using a Barnstead E-pure system (Dubuque, IA).

Instrumentation: A high-efficiency photochemical reactor assembly (FIG. 1 a-c) was made of synthetic quartz (Titan Instrument, Beijing, China). The three-fold sample channel, with a 0.8 mL internal volume, was embedded inside a 19 W low-pressure mercury discharge lamp for maximal UV exposure. Synthetic quartz renders both 253.7 nm and 184.9 nm Hg lines available for photoreactions. The 4 mm od sample inlet and outlet were spliced with $\frac{1}{8}$" od PTFE tubing using PTFE/PVDF heat-shrink tubing. To protect users from UV exposure, the photoreactor assembly was installed inside a vented aluminum enclosure.

The body of MGLS (FIG. 2 a-c) was custom made using polyether ether ketone (PEEK). The upper half measured 127×19×14 mm (l×w×h) and the lower half 127×19×34 mm (l×w×h). A 100×4×1.5 mm (l×w×h) sample channel was cut on the upper half while a 100×4×5 mm (l×w×h) gas channel was cut on the lower half. Porous PTFE membrane (PTU0214210, SteriTech, Auburn, WA, USA), with a 0.2 μm nominal pore size, was installed between two halves without using a gasket. Inlets and outlets were also provided to connect to $\frac{1}{16}$" and $\frac{1}{8}$" PTFE tubing for the photoreactor effluent and purge gas (argon or nitrogen, vide infra), and nebulizer and ICPMS, respectively.

Three configurations of experimental setups (see FIGS. 1a-c) were tested. No MGLS was used in configuration 1 (FIG. 1a). The sample solution was introduced to the photoreactor 3 at 1.1 mL/min. The effluent, liquid and bubbles included, was purged by argon 6 at 1 L/min flowrate to a Meinhard concentric nebulizer 5 that was part of the 7900 Agilent ICPMS (Santa Clara, CA) instrument. The aerosols formed and dissolved gases were liberated in a Scott type double-pass spray chamber 7. An MGLS 13 was used in configurations 2 and 3. In configuration 2 (FIG. 1b), argon in the dilution line 9 was used at 0.25 L/min flow rate to purge gases of bubble origin to the ICPMS 10. The resulting aerosols were separated in the spray chamber 7; fine aerosols and liberated gas including vapor 8 were combined with gas of bubble origin and detected. In configuration 3 (FIG. 1c), nitrogen 17 at 0.25 L/min flow rate was used to purge gas of bubble origin from MGLS 13 to the exhaust 18. Only the liquid portion of the photoreactor effluent 14 was nebulized into mist and contributed to analytical signal. Dissolved gases in the liquid flow were liberated and detected as well. After comparison of experimental results of all configurations, configuration 3 was chosen as the preferred configuration.

An Agilent 7900 ICPMS (Santa Clara, CA, USA) was used in this work under operation parameters listed in Table 1. In all experiments, 5% (v/v) formic acid were used as LMWCA PVG medium. Reagent only solutions were prepared by diluting the working stock solutions to the appropriate concentrations in the working standard solutions in 5% formic acid. Samples were then tested in the selected configuration with UV lamp on or off. Triplicate data were taken; the signals were recorded in peak height.

TABLE 1

| ICP-MS operation parameters | |
|---|---|
| Instrument | |
| Model | Agilent 7900 |
| Uptake Time | 120 seconds |
| Stabilization Time | 60 seconds |
| Rinse Time | 330 seconds |
| Monitored Mass | V[51], As[75], Se[78], Se[82], Tl[205], Pb[208] |
| Peristaltic pump flow rate | 1.0-1.2 ml min$^{-1}$ |
| ICP Parameter | |
| RF Power | ≤1600 W |
| Dilution Line Flow | 0.25 l min$^{-1}$ |
| Carrier gas flow rate | 1.0 l min$^{-1}$ |
| Tune Modes | No Gas, He 2.0 ml min$^{-1}$ |

MGLS Design and Performance.

Ideally, a phase separator must fulfil two tasks: to exclude bubbles from the liquid flow without introducing any time delay, and to maintain the flow pressurized without another nebulization pump. Among all GLS designs reported thus far, the porous membrane gas-liquid separator (MGLS) described is the only GLS type that qualified for this task. As shown in FIG. 2c, the photoreactor output stream or eluent 4 flows through a liquid channel 23, while bubbles permeated the membrane into an opposing gas channel 24. Typically built around a porous polytetrafluoroethylene (PTFE) membrane in a tubular or sheet format, MGLS possesses the unique advantages in small internal volume. More importantly, while the porous membrane allows easy permeation of gases at low pressure, the membrane surface forms a hydrophobic barrier to liquid flow when its pressure is below liquid entry pressure (LEP). These unique features of MGLS enable debubbling yet maintain the liquid pressurized without introducing any time delay.

PEEK was chosen as the material for GLS body because of its excellent chemical resistance, hardness, and machinability. Chemically inert PTFE was also used, but its inherent softness and deformability compromised structural integrity of the final assembly. The liquid channel cut on the upper half rendered a small (600 µl) volume; whereas the volume of gas channel cut on the lower half measured 2 mL. The photoreactor effluent 4 contained liquid, bubbles, as well as dissolved products from photolytic oxidation of the LMWCA and photoreduction of analytes. Analyte vapor is the desired product of PVG reactions: whereas other products including photolytic products of the LMWCA and moisture may interfere with atomization and ionization, and dilute analyte ions in the plasma.

For phase separation, the membrane must be subject to a pressure below the liquid entry pressure (LEP) calculated from:

$$\Delta P = 2\gamma \, \text{Cos} \, \theta / r$$

Where ΔP is the LEP, γ is the liquid surface tension, θ is the contact angle between liquid and membrane, r is the pore radius. Related parameters are difficult to measure precisely; users may obtain LEP from the manufacturer. In this work, several membranes were tested (Table 2). Working pressure and fatigue combined may cause structural failure. A grit support can be useful to prolong membrane lifetime.

TABLE 2

| Porous PTFE membranes used | | |
|---|---|---|
| Manufacturer | Pore size | LEP |
| Porex ® | 3.0 um | 200 mBar |
| Advantec ® | 0.2 um | not tested |
| Sterlitech ® | 0.1 um | 4.14 mBar |
| Sterlitech ® | 0.2 µm | not tested |

Analytical performance. As, Se, Co, and Pb were chosen as PVG-active model analytes in this work. Vanadium (V) and silver (Ag) are known to be PVG-inactive; so is thallium (Tl) unless a catalyst is used. In the absence of a catalyst, V, Ag, and Tl were used as model analytes for PVG-inactive analytes. Three configurations were compared in terms of signal count and RSD.

The results (in Table 3) demonstrate improved RSD for both PVG-active and inactive elements in configuration 2 vs. configuration 1. This gain originated from bubble exclusion from the photoreactor effluent. The MGLS functioned as expected: the bubble-segmented liquid stream or effluent became smooth and continuous leading to stable nebulization. When switching from configuration 2 to configuration 3, improvement in RSD was again observed except for Se. This consequence was due to discarding gas of bubble origin so that the plasma was not affected by pulsation in the influx of such gases including photochemically generated vapor. Among three configurations tested, the best signal stability was obtained in configuration 3. Measurement and calculation were based on peak height in this work; if both were based on peak area, better results can be expected.

TABLE 3

Performance comparison of 10 Elements, with or without using the MGLS. The UV lamp was on, and the photoreduction medium was 5% formic acid. The ion concentrations were calculated from serial dilution of a multi-element mix. (Note: He 2.0 indicates helium collision mode under 2 ml min$^{-1}$ flowrate)

| Analytes | Concentration (ng ml$^{-1}$) | Configuration 1 (FIG. 1a) Count C1 | RSD (%) | Configuration 2 (FIG. 1b) Count C2 | RSD (%) | Configuration 3 (FIG. 1c) Count C3 | RSD (%) | (C3 − C1)/C1 (%) |
|---|---|---|---|---|---|---|---|---|
| Ag[107] | 15.1 | 731050 | 10.4 | 642388 | 3.4 | 703098 | 2.8 | −3.82 |
| As[75] He 2.0 | 1.51 | 12626 | 4.8 | 12583 | 4.3 | 13990 | 3.7 | 10.80 |
| Cd[111] He 2.0 | 0.501 | 5091 | 5.4 | 5105 | 4.3 | 4635 | 4.1 | −8.96 |
| Co[59] | 5.02 | 391059 | 2.9 | 379119 | 1.8 | 392025 | 1.4 | 0.25 |
| Hg[201] He 2.0 | 3.02 | 240284 | 4.9 | 214969 | 4.3 | 293696 | 4.0 | 22.23 |
| Pb[208] | 0.500 | 36509 | 6.1 | 33267 | 2.3 | 34286 | 2.0 | −6.09 |
| Se[78] He 2.0 | 15.0 | 120067 | 5.3 | 110784 | 4.1 | 92100 | 5.3 | −23.29 |
| Se[82] He 2.0 | 15.0 | 54486 | 6.9 | 50540 | 4.1 | 42415 | 6.0 | −22.15 |
| Ni[60] | 20.2 | 577918 | 13.6 | 587394 | 11.9 | 491849 | 2.2 | −14.89 |
| Tl[205] He 2.0 | 0.799 | 71475 | 3.3 | 62507 | 3.0 | 69018 | 2.6 | −3.44 |
| V[51] | 10.0 | 663022 | 3.0 | 647167 | 1.7 | 657629 | 1.5 | −0.81 |

Next, the signal counts between configurations 1 and 3 were compared. For three PVG-inactive elements Ag, Tl, and V plus PVG-active Co, insignificant differences (<4%) were found. For 4 PVG-active elements (Cd, Pb, Se, and Ni) configuration 3 yielded lower counts than configuration 1. This was expected because gas of bubble origin was discarded to the exhaust including photochemically generated vapor. However, for the remaining two PVG-active elements, As and Hg, configuration 3 yielded considerable higher counts (10.8% and 22.2%, respectively) than configuration 1. When formic acid was used as the photoreduction medium, the volatile species of As and Hg were identified as $AsH_3$ and $Hg^0$ vapor, respectively. This paradox can be explained by: (1) this MGLS design provided only a small, narrow liquid channel; the lack of argon-PVG reactor effluent contact area slowed down liberation of volatile species of these two elements; (2) dilution of plasma density by gaseous influx of bubble origin was significant for As and Hg; (3) some components of gaseous influx adversely affected ionization of As and Hg species in the plasma, (4) the arrival times of fine aerosols and gas influx were different, so the signals failed to overlap.

For all elements tested, the signal count difference between configurations 1 and 3 were below 23.3%. The main goals of this work were to improve signal-to-noise ratio (S/N) for PVG-active elements yet maintain universal coverage for PVG-inactive elements. These goals were fully met. Comparison of multi-element quantification by PVG is complicated because behavior of one element can be physically and chemically different from the others. It can also be concluded that the nebulizer-spray chamber combination functioned as an effective GLS for releasing and separating photochemically generated gases including decomposition products and analyte vapor. The contact area between aerosols and argon gas was much larger in the spray chamber vs. the MGLS. When the gas of bubble origin was discarded, it was beneficial to suppress liberation of photogenerated vapor in the MGLS and allow release of the majority of vapor in the spray chamber for detection. In multi-elemental analysis, interference from transition metal is a valid concern; luckily, PVG gains an advantage vs. HG in this aspect.

A formic acid molecule contains one carbon atom. Carbon accumulation on the sample and skimming cones of the ICP instrument was a valid consideration, therefore, the concentration of formic acid was limited to 5%. Certain elements, such as Cd or Co or Hg, however, require a much higher concentration for effective photoreduction. To avoid carbon buildup on the cones, oxygen can be introduced to burn off carbon to $CO_2$. Finally, it must be pointed out that the post-PVG liquid is nebulized for detection of PVG-inactive elements, so the matrix separation advantage of PVG is lost similar to a PN-HG dual-mode system.

We claim:

1. A method of sample introduction to an ICP-based spectrometer comprising the steps of:
   a) passing a liquid sample analyte exposure to a UV source to produce a photochemically reduced sample analyte stream,
   b) passing said photochemically reduced sample stream over a porous membrane to separate bubbles in the liquid to produce a debubbled liquid stream,
   c) nebulization of the debubbled liquid stream, and,
   d) feeding the mist-vapor mixture to an ICP-based spectrometer.

2. The method of claim 1 wherein the porous membrane separating gas to one side of the membrane and liquid on the other side of the membrane is made of polytetrafluoroethylene (PTFE), PCTFE (polychlorotrifluoroethylene), FEP (fluorinated ethylene propylene), or perfluoroalkoxy (PFA).

3. The method of claim 1 of passing said photochemically reduced liquid sample stream over said porous membrane with the liquid sample on one side of the membrane and gas phase on the other side of the membrane.

4. The method of claim 3 wherein the gas phase is swept by a purge gas stream.

5. The method of claim 4 wherein the purge gas stream is an inert gas stream.

6. The method of claim 1 wherein the sample introduction is to an inductively coupled plasma mass spectrometer.

7. The method of claim 1 wherein the sample introduction is to an inductively coupled optical emission spectrometer.

8. An inductively coupled plasma mass spectrometer with a membrane gas flow separator system for dual-mode pneumatic nebulization-photochemical vapor generation sample introduction comprising:
   a photochemical reactor with a source of UV light for photochemical reduction of an analyte stream for analysis;
   a porous membrane gas-liquid separator (MGLS) or debubbler to practically eliminate segmentation of photoreactor effluent;
   a nebulizing system connected to the output stream of the porous membrane gas-liquid separator to nebulize the liquid separated from bubbles; and,
   a spectrometer connected to the analyte mist stream.

9. The porous membrane gas-liquid separator (MGLS) system of claim 8 with the two cavities,
   wherein the cavities are on either side of the porous membrane,
   one cavity is for a liquid and one cavity for a gas stream, wherein a photoreactor effluent flows through the liquid cavity in contact with the porous membrane, with removal of bubbles that permeate through the membrane into the gas cavity which is connected to a gas inlet admitting a purge gas to sweep bubbles to the gas outlet.

* * * * *